US011867582B2

(12) United States Patent
Kolberg et al.

(10) Patent No.: US 11,867,582 B2
(45) Date of Patent: Jan. 9, 2024

(54) ASSEMBLY AND METHOD FOR MEASURING STRAIN IN A WASHER

(71) Applicant: SINTEF TTO AS, Trondheim (NO)

(72) Inventors: Sigbjørn Kolberg, Oslo (NO); Magnus Hjelstuen, Trondheim (NO); Tor Arne Reinen, Trondheim (NO)

(73) Assignee: SINTEF TTO AS, Trondheim (NO)

( * ) Notice: Subject to any disclaimer, the term of this patent is extended or adjusted under 35 U.S.C. 154(b) by 477 days.

(21) Appl. No.: 17/275,063

(22) PCT Filed: Sep. 5, 2019

(86) PCT No.: PCT/NO2019/050175
§ 371 (c)(1),
(2) Date: Mar. 10, 2021

(87) PCT Pub. No.: WO2020/055261
PCT Pub. Date: Mar. 19, 2020

(65) Prior Publication Data
US 2022/0057282 A1    Feb. 24, 2022

(30) Foreign Application Priority Data
Sep. 12, 2018  (NO) .................................... 20181195

(51) Int. Cl.
*G01L 5/24*   (2006.01)
*F16B 31/02*  (2006.01)
(Continued)

(52) U.S. Cl.
CPC ............ *G01L 5/243* (2013.01); *F16B 31/028* (2013.01); *G01L 5/246* (2013.01); *G01N 29/12* (2013.01); *G01N 29/343* (2013.01); *F16B 2031/022* (2013.01); *G01N 29/07* (2013.01); *G01N 29/326* (2013.01); *G01N 2291/044* (2013.01)

(58) Field of Classification Search
CPC ................................ G01L 5/243; G01L 5/246
See application file for complete search history.

(56) References Cited

U.S. PATENT DOCUMENTS 3,461,715 A * 8/1969 Stover ..................... G01L 5/243
                                                    73/818
3,969,810 A    7/1976 Pagano
(Continued)

FOREIGN PATENT DOCUMENTS

| CH | 432046  | 9/1967 |
| CN | 1662797 | 8/2005 |

(Continued)

OTHER PUBLICATIONS

Search Report mailed in NO 20181195 dated Apr. 12, 2019 (3 pages).
(Continued)

*Primary Examiner* — Ryan D Walsh
(74) *Attorney, Agent, or Firm* — Wissing Miller LLP (57) ABSTRACT

The invention relates to a solution for how to measure the strain in a washer mounted in a bolt assembly comprising a bolt, nut and washer. The invention concerns a strain measuring washer assembly comprising a plate shaped washer body, sound emitting means and sound detecting means, and a method for using such.

20 Claims, 7 Drawing Sheets

(51) Int. Cl.
*G01N 29/12* (2006.01)
*G01N 29/34* (2006.01)
*G01N 29/07* (2006.01)
*G01N 29/32* (2006.01)

(56) References Cited

U.S. PATENT DOCUMENTS

| | | | |
|---|---|---|---|
| 4,062,227 A | 12/1977 | Teyman | |
| 4,362,059 A * | 12/1982 | Zwyssig | G01N 29/30 73/628 |
| 4,471,657 A | 9/1984 | Voris | |
| 5,222,399 A * | 6/1993 | Kropp | G01L 1/20 177/210 R |
| 5,308,973 A * | 5/1994 | Odoni | G01L 1/243 250/227.17 |
| 5,807,048 A | 9/1998 | d'Agraives | |
| 5,970,798 A | 10/1999 | Gleman | |
| 5,973,317 A * | 10/1999 | Hay | G01L 5/243 385/12 |
| 6,250,863 B1 * | 6/2001 | Kamentser | G01L 1/2231 73/761 |
| 7,152,475 B2 | 12/2006 | Nakamura | |
| 7,289,033 B2 * | 10/2007 | Hockersmith | A61B 6/56 382/128 |
| 7,350,420 B2 * | 4/2008 | Burmann | G01L 5/246 73/761 |
| 9,127,998 B1 | 9/2015 | Guldiken | |
| D793,259 S | 8/2017 | Furer | |
| 9,978,190 B2 * | 5/2018 | Lopes | G01L 5/24 |
| 10,941,802 B2 * | 3/2021 | Zhu | G06K 19/07758 |
| 2006/0130590 A1 | 6/2006 | Kibblewhite | |
| 2007/0056375 A1 | 3/2007 | Akdeniz | |
| 2009/0151466 A1 * | 6/2009 | Wu | G01L 5/24 73/761 |
| 2010/0116101 A1 * | 5/2010 | Dral | B25B 23/14 411/533 |

FOREIGN PATENT DOCUMENTS

| | | | | |
|---|---|---|---|---|
| CN | 106031197 | | 10/2016 | |
| CN | 206945895 | | 1/2018 | |
| CN | 109372882 | A * | 2/2019 | |
| DE | 102009043267 | | 4/2011 | |
| EP | 0140066 | | 5/1985 | |
| EP | 0766077 | A1 * | 4/1997 | |
| EP | 2543978 | | 1/2013 | |
| EP | 3339663 | | 6/2018 | |
| ES | 2812299 | A1 * | 3/2021 | F16B 31/028 |
| KR | 20110136110 | | 12/2011 | |
| KR | 20180023618 | | 3/2018 | |
| KR | 101890383 | | 8/2018 | |
| NO | 20140596 | | 11/2015 | |
| WO | 2015018559 | | 2/2015 | |

OTHER PUBLICATIONS

Erdem, «Force and weight measurement», J. Phys. E: Sci. Instrum., vol. 15 (9), Sep. 1, 1982, ISSN 0022-3735, XP 020016901; Sammendrag, kapittel 9, figur 11.

International Search Report and Written Opinion mailed in PCT/No. 2019/050175 dated Nov. 12, 2019 (9 pages).

Supplementary European Search Report mailed in EP 19860593 dated Mar. 22, 2022 (3 pages.).

International Preliminary Report on Patentability mailed in PCT/NO2019/050175 dated Mar. 25, 2021 (6 pages.).

First Office Action mailed in corresponding Chinese Appln No. 201980059833.6 dated Jul. 1, 2022 (4 pages).

English Translation of First Office Action mailed in corresponding Chinese Appln No. 201980059833.6 dated Jul. 1, 2022 (5 pages).

First Search Report mailed in corresponding Chinese Appln No. 201980059833.6 dated Jul. 1, 2022 (2 pages) (No English translation was available in the Global Dossier).

* cited by examiner

Figure 14

ASSEMBLY AND METHOD FOR MEASURING STRAIN IN A WASHER

CROSS-REFERENCE TO RELATED APPLICATIONS

This application is a 371 of PCT/NO2019/050175 filed on Sep. 5, 2019, published on Mar. 19, 2020 under publication number WO 2020/055261, which claims priority benefits from Norwegian Patent Application No. 20181195 filed Sep. 12, 2018, the disclosure of each is incorporated herein in their entirety by reference.

TECHNICAL FIELD

The disclosure relates to a device and method for measuring a load on a washer, e.g. when mounted as a part of a bolt assembly comprising a bolt, washer and a nut.

BACKGROUND

A washer is a type of hardware commonly used in order to control and distribute the load from a bolt or nut. A washer can be made up from a range of materials and can exists in a wide variety of types and shapes, including annular washers, toothed lock washers, tab washers, split washers, Belleville washers etc.

Many applications require that bolt assemblies, i.e. a bolt, nut and optionally a washer, are fastened and maintained with a load within a predetermined threshold. In order to achieve this, bolts are typically fastened with a specific torque, controlled by e.g. various torque wrench tools or similar. Although being cheap and simple tools for controlling the load on bolts, torque wrenches suffer from poor accuracy due to e.g. friction in the bolt assembly and friction between the bolt assembly and the application to which the bolt assembly is fastened. Torque wrenches are also impractical when controlling the load on an already mounted bolt assembly, as one has to perform a time consuming loosening and subsequent tightening procedure in order to measure the load.

Various alternatives to the torque wrench for how to measure the load in bolt assemblies have been developed over the years. This generally includes methods where the load is measured through direct use of pressure gauges mounted somewhere in the bolt assembly, e.g. in the nut or washer, or where the load is estimated from the expansion of the bolt. The latter is commonly measured through use of ultrasonic sound measurements that utilize transit times of acoustic pulses in order to determine the expansion of the bolt.

There are, however, problems related to these alternative methods as they e.g. might be cumbersome, expensive and/or time consuming to perform, or that they do not offer an adequate sensitivity in their measurement of the bolt load. The direct use of pressure gauges mounted somewhere in the bolt assembly requires e.g. complex assembling methods and extensive wiring, hence leading to a high production cost, reduced lifespan and difficulties related to the performing of a load measurement. Ultrasonic measurements of expansion in the bolt suffer on the other hand from poor reliability due to creep in the bolt involving a transition from elastic to plastic deformations over time.

It is the goal of the present invention to provide an improved solution for how to measure the load on bolt assemblies.

SUMMARY OF THE INVENTION

In a first aspect of the present invention, the invention provides a strain measuring washer assembly comprising a plate shaped washer body, at least provided with a washer body central opening extending through the plate shaped washer body, a washer body outer peripheral surface, and a closed internal cavity surrounding the washer body central opening, sound emitting means, positioned on the washer body outer peripheral surface and configured to emit a sound signal into the plate shaped washer body, and sound detecting means positioned on the washer body outer peripheral surface and configured to detect an echo response of the sound signal from the plate shaped washer body. The plate shaped washer body may further be provided with a second cavity connected with the closed internal cavity. The plate shaped washer body may additionally or alternatively further be provided with an internal reference cavity isolated from any other internal cavity of the plate shaped washer body.

The plate shaped washer body of the strain measuring washer assembly may according to one embodiment of the invention comprise a base plate body and lid, where the base plate body is at least provided with a base plate body central opening extending through the base plate body, a base plate body outer peripheral surface, and a closed recess on a base plate body top side surrounding the base plate body central opening and extending within boundaries defined by the base plate body central opening and a base plate body outer periphery, and where the lid is configured to be fused to the base plate body top side, forming one integral plate shaped washer body where the recess in the base plate body forms the closed internal cavity in the plate shaped washer body. The base plate body may further be provided with a second recess on the base plate body top side that extends within boundaries defined by the base plate body central opening and the base plate body outer periphery, and where the second recess forms the second cavity in the plate shaped washer body when the lid is fused to the base plate body top side.

According to one embodiment of the invention, the second cavity may be shaped as a rectangular box or a sphere.

Any said cavity in the plate shaped washer body may according to yet another embodiment of the present invention be filled with a fluid. The plate shaped washer body may be provided with a fluid filler port on the washer body outer peripheral surface, comprising a sealable passage through the plate shaped washer body into the closed internal cavity.

According to one embodiment of the present invention, the sound emitting means and the sound detecting means may be positioned adjacent to one another. The sound emitting means and the sound detecting means may alternatively constitute one unit.

According to yet another embodiment of the present invention, the plate shaped washer body may be an annular body extending a length parallel with its central principle axis.

In a second aspect of the present invention, the invention provides a washer strain measurement method comprising the steps of: providing a plate shaped washer body at least provided with a washer body central opening extending through the plate shaped washer body, a washer body outer peripheral surface and a closed internal cavity surrounding the washer body central opening, providing sound emitting means on the washer body outer peripheral surface, providing sound detecting means on the washer body outer peripheral surface, emitting a sound signal into the plate shaped washer body by the sound emitting means, detecting a sound echo response of the sound signal, from the plate shaped washer body, by the sound detecting means, and calculating a strain on the plate shaped washer body at least based on the sound echo response.

The plate shaped washer body may according to one embodiment of the present invention further be provided with a second internal cavity connected with the closed internal cavity.

The plate shaped washer body may according to another embodiment of the present invention further be provided with an internal reference cavity isolated from any other internal cavity of the plate shaped washer body.

According to another embodiment of the present invention, the emitted sound signal is a sound pulse. The sound echo response may comprise an echo response of the sound pulse reflecting off at least one inner surface of at least one of the internal cavities of the plate shaped washer body, and the calculating of the strain on the strain measuring washer assembly may be based on a time delay between the emitting of the sound pulse and the detecting of the sound echo response.

According to yet another embodiment of the present invention, the emitted sound signal may be a continuous sound signal. The continuous sound signal may comprise sound frequencies from within the range between 1 MHz and 10 MHz. The sound echo response may comprise an echo response of the sound signal resonating in at least one of the internal cavities of the plate shaped washer body, and the calculating of the strain on the strain measuring washer assembly may be based a resonance frequency of at least one of the internal cavities in the plate shaped washer body.

According to yet another embodiment of the present invention the echo response may comprise a reference echo response from the internal reference cavity, and the washer strain measurement method may further comprise the steps of: calculating a reference strain on the plate shaped washer body at least based on the reference echo response, and estimating a true strain on the on the plate shaped washer body at least based on the calculated strain and the calculated reference strain.

Other advantageous features will be apparent from the accompanying claims.

BRIEF DESCRIPTION OF THE DRAWINGS

In order to make the invention more readily understandable, the discussion that follows will refer to the accompanying drawings, in which.

DETAILED DESCRIPTION OF THE INVENTION

In the following, general embodiments as well as particular exemplary embodiments of the invention will be described. References and possible numerals will be made to the accompanying drawings. It shall be noted, however, that the drawings are exemplary embodiments only, and that other features and embodiments may well be within the scope of the invention as described.

The present invention relates to the use of acoustic signals for measuring a load on a bolt assembly.

In a first aspect of the present invention, the invention provides a strain measuring washer assembly comprising a plate shaped washer body, sound emitting means and sound detecting means.

Figure 2:
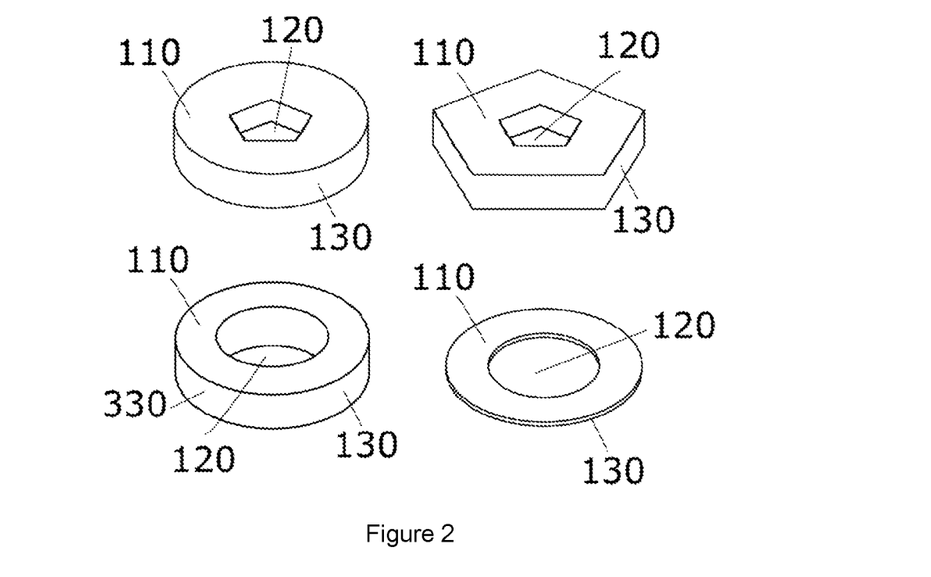
FIG. 2 is a schematic representation of some examples of differently shaped washer bodies.

The plate shaped washer body 110 may according to any embodiment of the invention have a shape that makes it suitable for use as a washer. Examples of such shapes are shown in FIG. 2 and includes e.g. that of a Belleville washer, wave washer, tab washer, split washer, toothed washer etc. The washer body will generally have a shape similar to that of a plain/flat washer. A plain/flat washer may be considered as an annular body 330 with a non-zero extension parallel with its central principle axis, a washer body central opening 120, and an outer peripheral surface 130.

Figure 1:
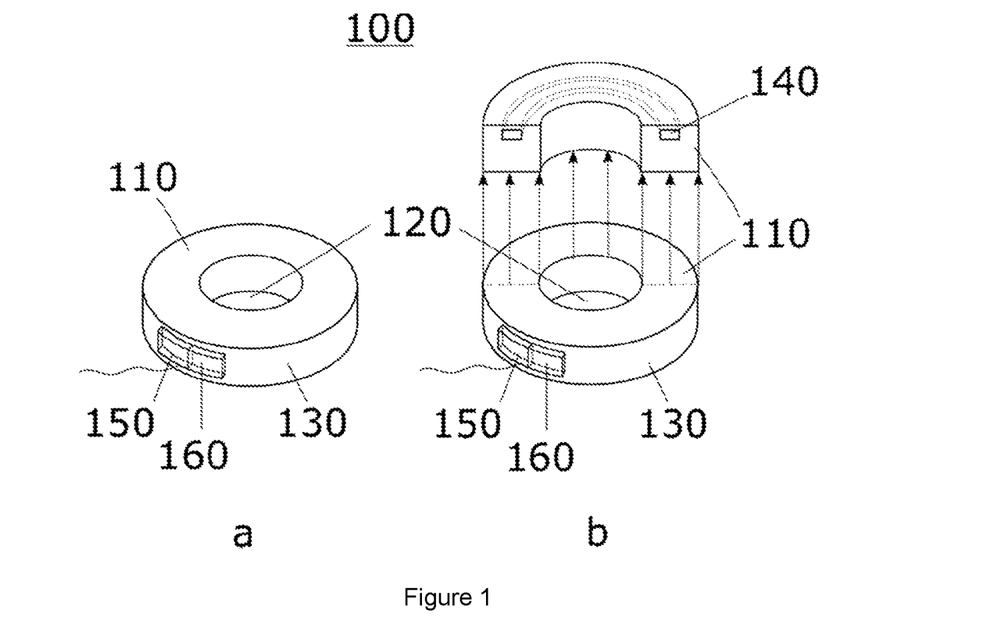
FIG. 1a is a schematic representation of a strain measuring washer assembly comprising a plate shaped washer body, sound emitting means, and sound detecting means.
FIG. 1b is a schematic representation of a cross sectional view of a plate shaped washer body provided with a closed internal cavity surrounding a washer body central opening.

FIG. 1 illustrates a plate shaped washer body 110 according to one embodiment of the invention, where the plate shaped washer body is at least provided with a washer body top side, a washer body bottom side, and a washer body outer peripheral surface 130. The washer body top side and bottom side are both configured to receive a load, and may form planar and parallel surfaces like those of a plain washer. They may, however, in general take on any shape and orientation. The washer body outer peripheral surface 130 is typically vertical and perpendicular to the washer body top and bottom side, but could in principle take on any shape, like a rounded or tilted shape etc.

The washer body may according to the invention be made up from any material suitable for making a washer, e.g. any type of metal or metal alloy, polymer, composite material, etc. The material may be deformable, either elastically or plastically and be essentially impermeable to fluids, and/or to inert gasses like nitrogen, argon, krypton etc.

A plate-shaped washer body is illustrated in FIG. 1, and is according to the invention at least provided with a washer body central opening 120 and a closed internal cavity. The internal cavity of the washer body is completely embedded/enclosed by the washer body, and surrounds the washer body central opening 120. The internal cavity may be shaped such that it is symmetric in shape around a centrum of the washer body central opening 120, e.g. such as an annulus or torus. The washer body central opening 120 extends through the washer body and may generally be essentially circular so that a conventional bolt may be guided through. It could alternatively be shaped as any type of polygon or cross sectional shape of any screw driver head, like a Clutch, Cross, Double square, Fearson, Mortorq, Pentalope, Philips, Torx, Mortorq, etc. Some examples of various washer body shapes and washer body central opening shapes are shown in FIG. 2.

Figure 3:
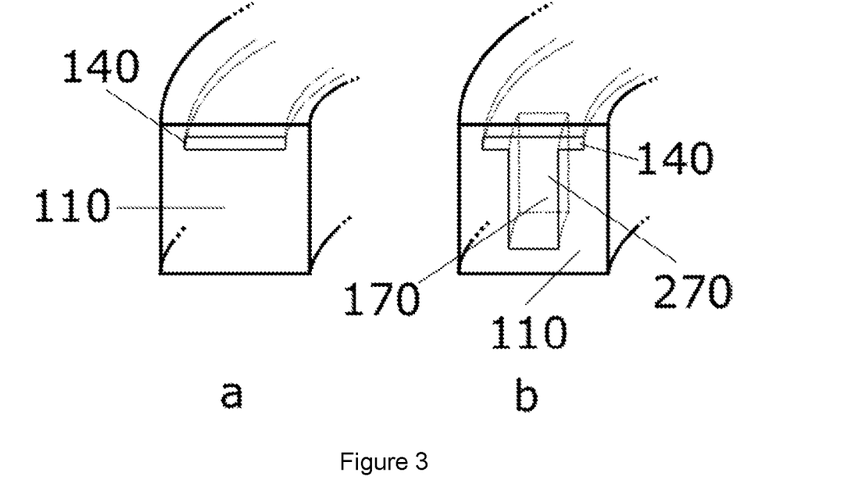
FIG. 3a is a schematic representation of a cross sectional segment of a plate shaped washer body provided with a closed internal cavity surrounding a washer body central opening.
FIG. 3b is a schematic representation of a cross sectional segment of a plate shaped washer body provided with a closed internal cavity surrounding a washer body central opening, and provided with an second cavity connected with the closed internal cavity.
Figure 6:
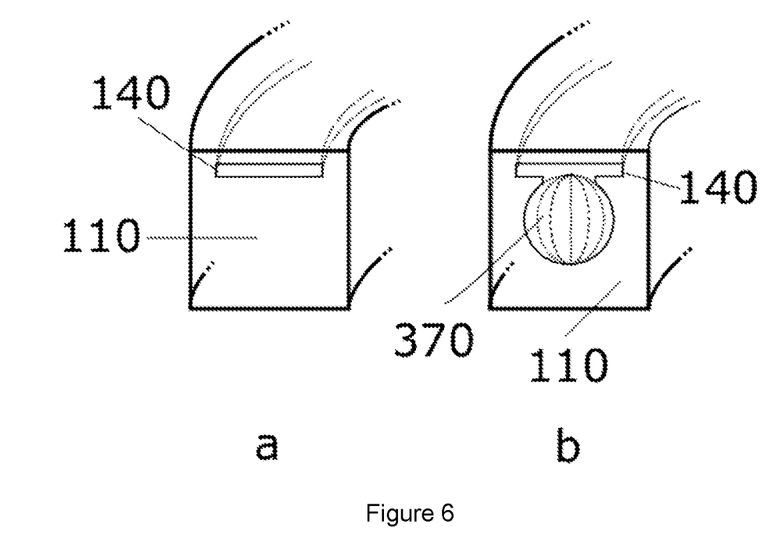
FIG. 6a is a schematic representation of a cross sectional segment of a plate shaped washer body provided with a closed internal cavity surrounding a washer body central opening.
FIG. 6b is a schematic representation of a cross sectional segment of a plate shaped washer body provided with a closed internal cavity surrounding a washer body central opening, and provided with a spherically shaped second cavity connected with the closed internal cavity.

The plate shaped washer body may as illustrated in FIGS. 3 and 6 further be provided with a second internal cavity 170 connected with the closed internal cavity 140. The two cavities will thus form one continuous cavity within the washer body. The second cavity may be configured to act as an acoustic resonator and may take various geometrical shapes, e.g. a rectangular box 270, sphere 370, cube, Helmholtz resonator, etc.

Figure 14:
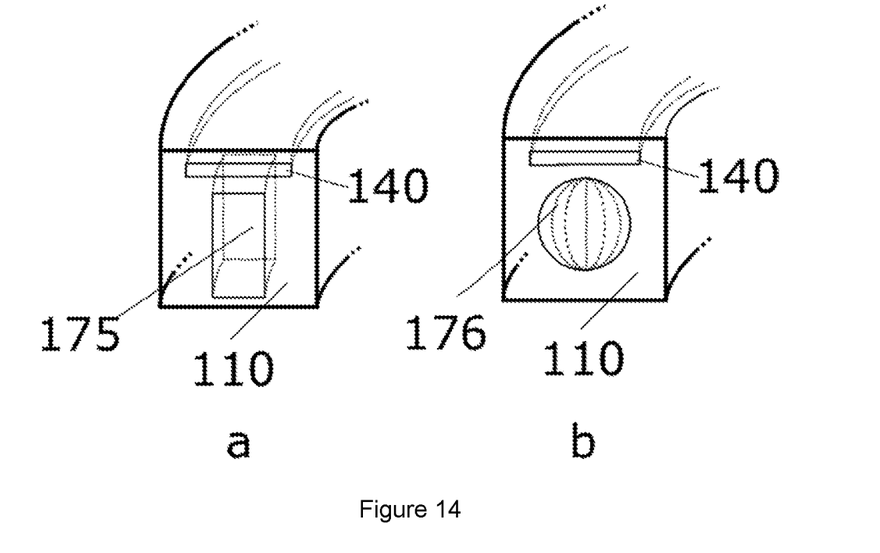
FIG. 14a is a schematic representation of a cross sectional segment of a plate shaped washer body provided with an internal reference cavity.
FIG. 14b is a schematic representation of a cross sectional segment of a plate shaped washer body provided with a spherical internal reference cavity.

The plate shaped washer body may as illustrated in FIG. 14 be further provided with an internal reference cavity 175 isolated from any other internal cavity of the plate shaped washer body. The internal reference cavity 175 can e.g. act as an acoustic resonator, and may take various geometrical shapes, e.g. a rectangular box, sphere 175, cube, Helmholtz resonator, etc. The internal reference cavity may according to this embodiment of the invention be shaped so that it is exposed to as little pressure as possible when the plate shaped washer body is subjected to a load.

Figure 7:
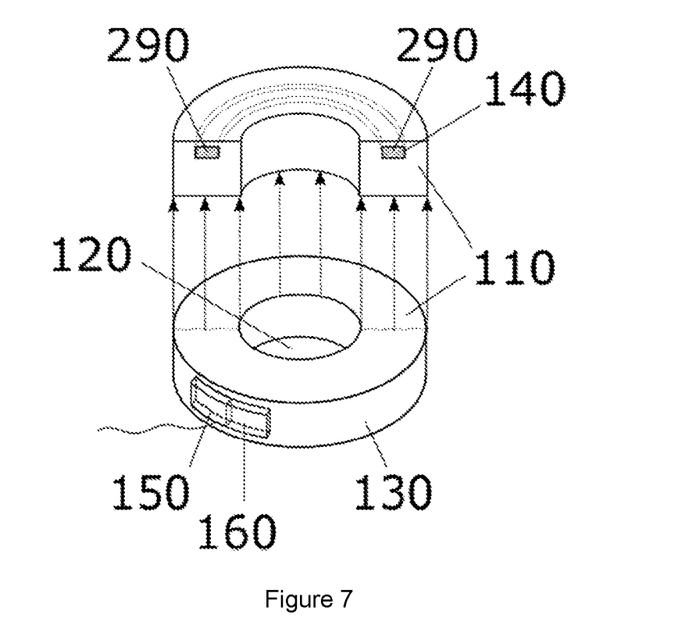
FIG. 7 is a schematic representation of a strain measuring washer assembly comprising a plate shaped washer body, and a cross sectional view of the plate shaped washer body provided with a closed internal cavity surrounding a washer body central opening being filled with a fluid.

Any cavity in the washer body may as exemplified in FIG. 7 be filled with a fluid 290. The fluid may e.g. be compressible and/or have a pressure dependent sound velocity, e.g. like various inert gasses, like noble gasses, or liquid oils, like a DB grade castor oil. The fluid may alternatively be incompressible and/or have an essentially zero thermal expansion coefficient.

Figure 8:
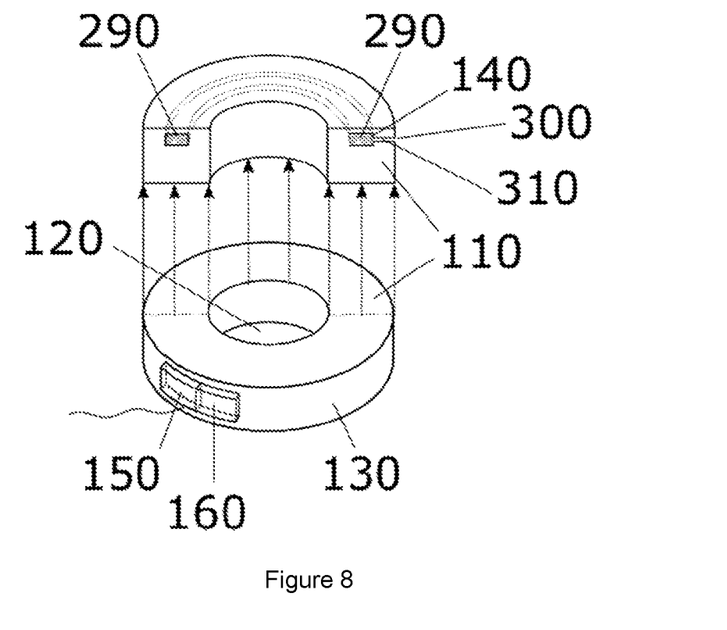
FIG. 8 is a schematic representation of a strain measuring washer assembly comprising a plate shaped washer body and a cross sectional view of the plate shaped washer body, where the plate shaped washer body is provided with a closed internal cavity and a fluid filler port on the washer body outer peripheral surface.
Figure 10:
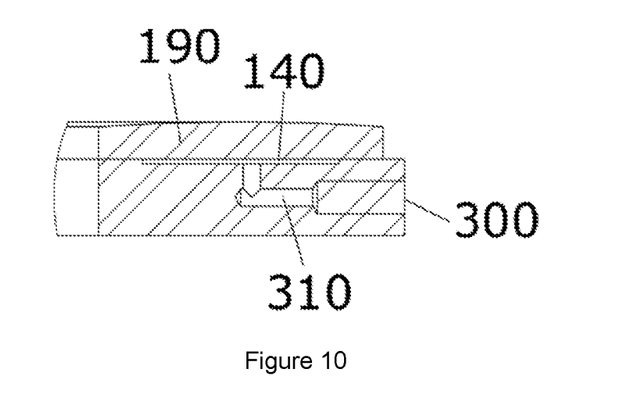
FIG. 10 is a schematic representation of a cross sectional view of a plate shaped washer body comprising a base plate body and a lid, where the base plate body is at least provided with a fluid filler port.

FIG. 8 shows an illustration according to one embodiment of the invention where the plate shaped washer body is provided with a fluid filler port 300 positioned on the washer body outer peripheral surface 130. The fluid filler port 300 is configured to be utilized for filling any internal cavity of the washer body with a fluid 290. This can e.g. be performed by first creating a vacuum in the cavity before utilizing the vacuum pressure to fill the cavity with a fluid 290. The fluid filler port may as shown in FIG. 10 comprise a sealable passage 310 through the plate shaped washer body into the closed internal cavity 140.

FIG. 1 shows the sound measuring washer assembly according to one embodiment of the invention, where sound emitting means 150 and sound detecting means 160 are positioned on the washer body outer peripheral surface 130. The sound emitting means 150 are at least configured to emit a sound into the plate shaped washer body 110, while the sound detecting means 160 are at least configured to detect sounds coming from the plate shaped washer body 110. The sound emitted by the sound emitting means 150 will typically propagate through the washer body where it will be reflected and transmitted by internal surfaces until it either escapes the washer body or is absorbed. The part of the emitted sound that escapes the washer body may be defined herein as an echo signal, or alternatively as an echo response. These terms are herein used interchangeably and may comprise various sound reflections and/or resonance signals. The echo signal is further used in order to derive various information related to the washer body. Such information may e.g. include one or more quantities chosen from the group comprising: the sound velocity in the washer, the sound velocity in any cavity in the washer body, and the level of deformation on the washer body.

Figure 4:
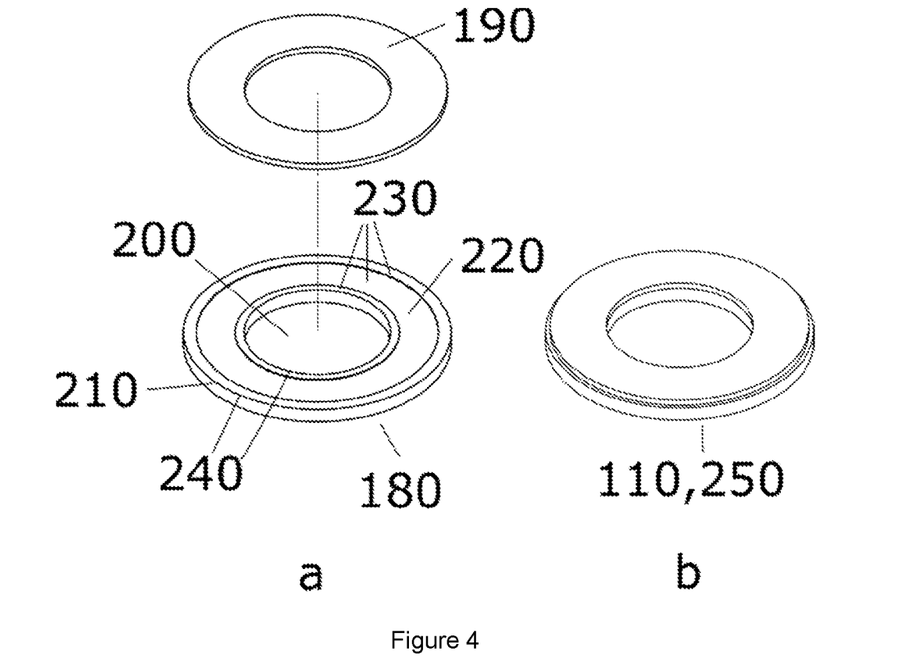
FIG. 4a is a schematic representation of a plate shaped washer body comprising a base plate body and a lid where the base plate body is at least provided with a closed recess on its top side that surrounds a base plate body central opening.
FIG. 4b is a schematic representation of an integral plate shaped washer body comprising a base plate body and a lid.
Figure 5:
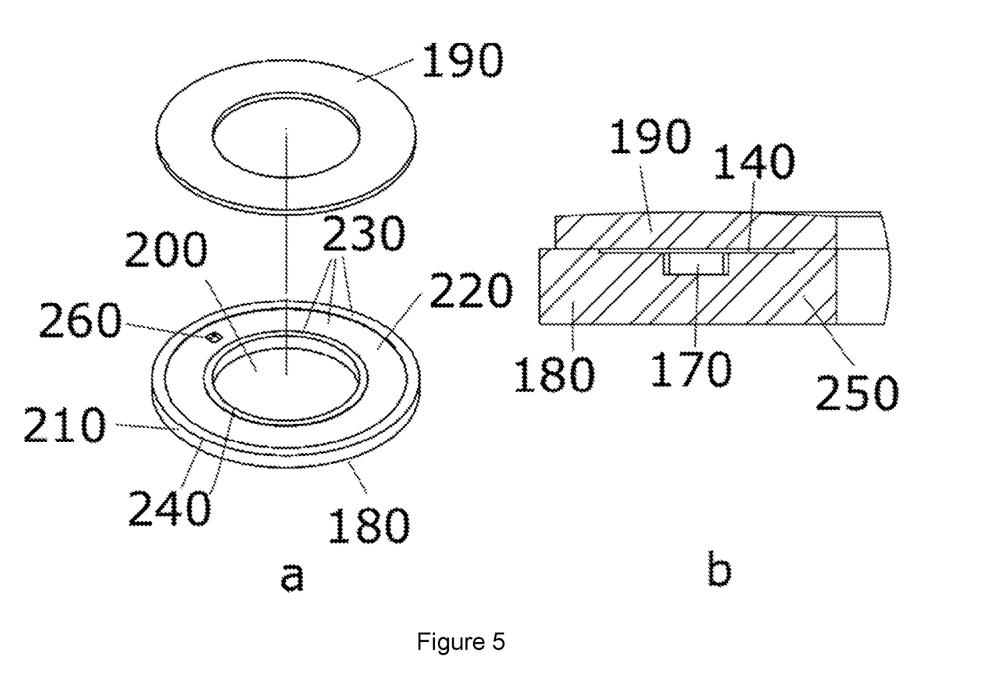
FIG. 5a is a schematic representation of a plate shaped washer body comprising a base plate body and a lid, where the base plate body is at least provided with a recess on its top side that forms an second cavity when the lid is fused onto the base plate body.
FIG. 5b is a schematic representation of a cross sectional view of a plate shaped washer body comprising a base plate body and a lid, where the base plate body is at least provided with a recess on its top side that forms an second cavity when the lid is fused onto the base plate body.
Figure 9:
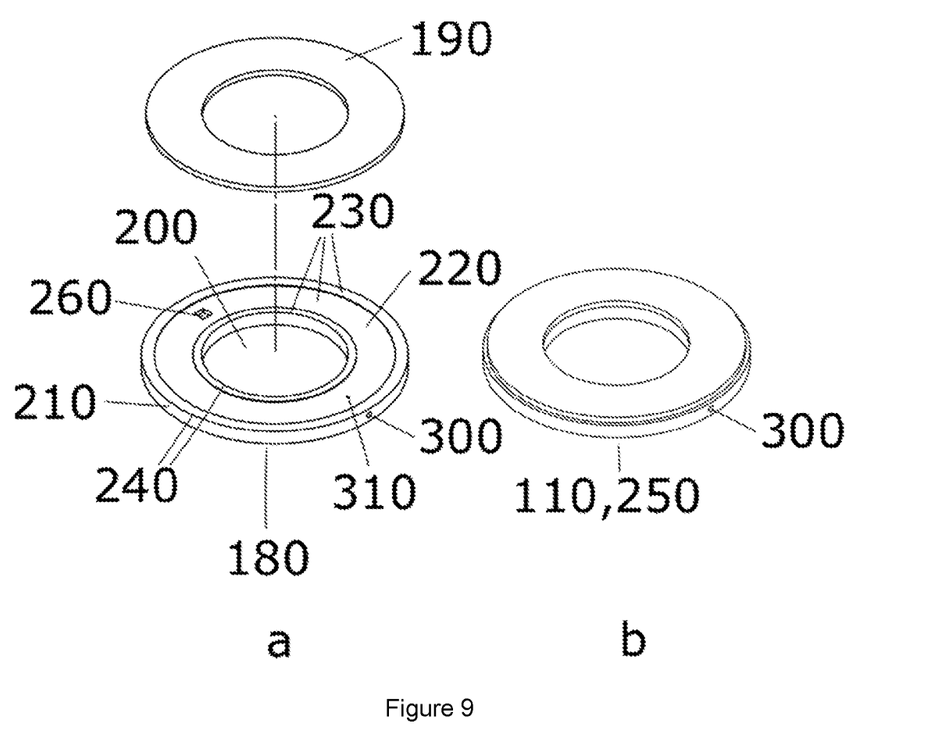
FIG. 9a is a schematic representation of a plate shaped washer body comprising a base plate body and a lid, where the base plate body is at least provided with a second recess on the base plate body top side, and a fluid filler port.
FIG. 9b is a schematic representation of an integral plate shaped washer body comprising a base plate body and a lid, where the base plate body is at least provided with a fluid filler port.

The plate shaped washer body 110 of the strain measuring washer assembly 100 may as illustrated in FIGS. 4, 5 and 9 comprise a base plate body 180 and lid. The baseplate and the lid 190 may have essentially similar outlines and be configured to be fused together in order to form an integral plate shaped washer body 110. The base plate body 180 is at least provided with a base plate body central opening 200 extending through the base plate body 180, a base plate body outer peripheral surface 210, and a closed recess 220 on the base plate body top side 230. The closed recess 220 surrounds the base plate body central opening 200, and extends within boundaries 240 defined by the base plate body central opening 200 and a base plate body outer periphery. The closed recess 220 is thus shaped such that it forms a closed internal cavity in the plate shaped washer body 110 when the lid 190 is fused to the base plate body top side 230.

The base plate body 180 may as illustrated in FIG. 5 further be provided with a second recess 260 on the base plate body top side 230. The second recess 260 extends according to this embodiment of the invention within boundaries 240 defined by the base plate body central opening 200 and the base plate body outer periphery. The second recess 260 consequently forms a second internal cavity 170 in the plate shaped washer body when the lid 190 is fused to the base plate body top side 230.

The sound emitting and sound detecting means may according to the invention be electroacoustic transducers or electromagnetic acoustic transducers. The transducers may be transducers from the group comprising moving magnet transducers, moving coil-based transducers, piezoelectric crystal-based transducers and magnetostrictive transducers. The sound signals may have a frequency in the range between 1 MHz and 10 MHz. The frequency may alternatively be higher than 10 MHz or lower than 1 MHz.

Figure 11:
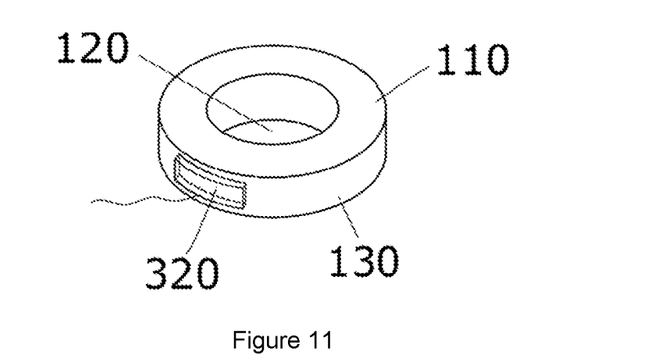
FIG. 11 is a schematic representation of a strain measuring washer assembly comprising a plate shaped washer body, sound emitting means, and sound detecting means, where the sound emitting means and sound detecting means constitute one unit.

The sound emitting and sound detecting means 160 may as shown in FIG. 1 be positioned adjacent to one another, e.g. in a horizontal or vertical alignment. The sound emitting means 150 and the sound detecting means 160 may as shown in FIG. 11 alternatively constitute one unit 320, meaning that the sound emitting means 150 are the same means as the sound receiving means.

In a second aspect of the present invention, the invention provides a washer strain measurement method. The method comprises the steps of: providing a plate shaped washer body, providing sound emitting means on the washer body outer peripheral surface, providing sound detecting means on the washer body outer peripheral surface, emitting a sound signal into the plate shaped washer body by the sound emitting means, detecting a sound echo response of the sound signal from the plate shaped washer body by the sound detecting means, and calculating a strain on the plate shaped washer body at least based on the sound echo response. The plate shaped washer body is at least provided with a washer body central opening extending through the plate shaped washer body, a washer body outer peripheral surface and a closed internal cavity surrounding the washer body central opening. The plate shaped washer body may be provided with a second internal cavity connected with the closed internal cavity. Alternatively or additionally the plate shaped washer body may be provided with an internal reference cavity isolated from any other internal cavity of the plate shaped washer body. Execution of the washer strain measurement method may involve permanently mounting the sound emitting means and sound detecting means on the plate shaped washer body. This kind of arrangement may thus be used to constantly probe the strain on the washer body, and consequently the bolt assembly. Alternatively, the washer strain measurement method may be executed by providing the sound emitting means and sound detecting means temporarily on the washer body, so as to perform a one-time measurement of the strain on the washer body. The latter method allows for the designing of any form of tool having built-in sound emitting means and sound detecting means that can be provided on demand on a washer body mounted on an application.

Figure 12:
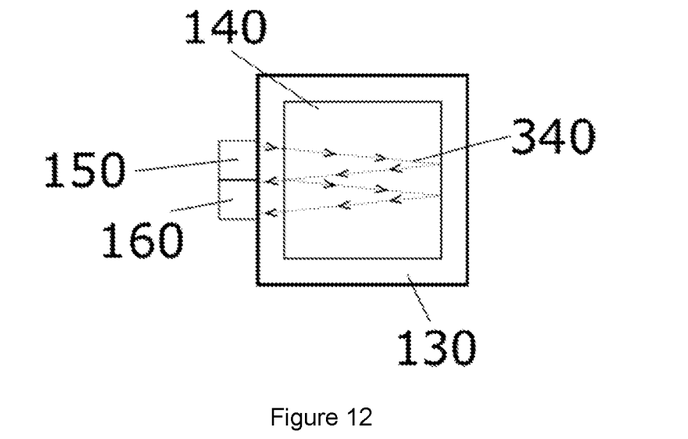
FIG. 12 is a schematic representation of a cross sectional view of a plate shaped washer body provided with sound emitting means and sound detecting means, where the sound emitting means emit a sound pulse that bounces back and forth inside an internal cavity of the plate shaped washer body.

The emitted sound signal is according to one embodiment of the invention a sound pulse 340. A sound pulse 340 may propagate through the washer body as illustrated in FIG. 12 until it collides with any external or internal interfaces of the washer body that causes it to split into two partial sound pulses through a reflection and transmission process. The various partial sound pulses may themselves undergo subsequent reflection and transmission processes, resulting in a series of partial sound pulses bouncing back and forth inside the washer body. Upon hitting an external surface of the washer body, any partial sound pulse will in part escape the washer body, and thus become detectable by the detector means. The sum of all the partial sound pulses escaping the washer body may according to this embodiment of the invention constitute the echo signal. A sound pulse may be considered as a transient sound signal. A pulse can be sharp or broad.

As illustrated in FIG. 12, a sound pulse 340 may upon colliding with an interface of an internal cavity of the washer body undergo a partial reflection and transmission process. One portion of the sound pulse will hence be reflected by the interface while another will be transmitted into the cavity. The transmitted portion will subsequently traverse the cavity and collide with the opposite interface of the cavity where it will undergo another reflection and transmission process that creates a second reflected as well as transmitted sound portion. The second reflected sound portion will subsequently stay in the cavity and repeat the process, resulting in sound pulses periodically escaping the cavity, and consequently the washer body. The time between two consecutive sound pulses escaping the cavity is i.e. determined by the shape and size of the cavity as well as the sound velocity in the medium in the cavity. Knowing the shape of the cavity and the time between two consecutive sound pulses escaping the cavity/washer body thus enables the calculation of the sound velocity in the medium in the cavity. The time between the emittance of a signal and detection of various sound pulses escaping a cavity/washer body may thus be used to calculate the sound velocity in the medium in the cavity.

The emitted sound signal may in one embodiment of the invention be a sound pulse characterized by having a limited time extension, typically in the microsecond regime. The sound echo response comprises at least an echo response of the sound pulse reflecting off at least one inner surface of at least one of the internal cavities of the plate shaped washer body. The calculating of the strain on the plate shaped washer body may consequently be based on a time delay between the emitting of the sound pulse and the detecting of the sound echo response. The calculating of the strain may be based on the difference in time delay between any detected sound pulses from the washer body.

Figure 13:
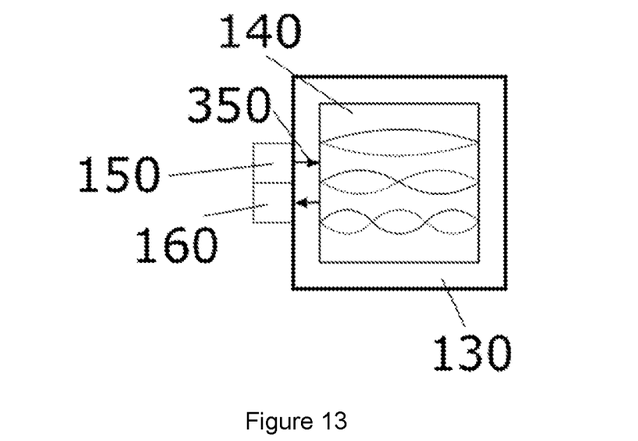
FIG. 13 is a schematic representation of a cross sectional view of a plate shaped washer body provided with sound emitting means and sound detecting means, where the sound emitting means emit a continuous sound that resonates inside an internal cavity of the plate shaped washer body.

The emitted sound signal may as illustrated in FIG. 13 be a continuous sound signal 350. A continuous sound signal 350 can according to this invention be considered as having a non-zero duration and may have a spectral distribution, e.g. be spectrally flat in a given frequency range, comprise white noise, etc. A continuous sound signal 350 will undergo the same reflections and transmissions as the sound pulse, but will unlike a sound pulse result in a constant signal escaping the washer body. This constant signal escaping the washer body will comprise all the same frequencies as were contained in the emitted continuous sound signal with exception of those being absorbed by the washer body or lost to scattering. The constant signal escaping the washer body will in this embodiment of the invention constitute the echo signal.

An internal cavity of the washer body may as illustrated in FIG. 13 be constructed so that it possess internal resonance frequencies, which may depend i.a. on the size and shape of the cavity, as well as on the medium contained in the cavity. Any of these internal resonance frequencies may match a frequency contained in a continuous sound signal 350 emitted by the sound emitting means 150. Upon being exposed to the continuous signal 350, the internal cavity will amplify the sound waves whose frequencies match its own resonance frequencies, resulting in characteristic amplitude increases in the echo signal at these frequencies.

Upon mounting a washer body in a bolt assembly, the washer body will be subjected to a compression force according to the load applied to the bolt assembly. This compression force will cause a strain on the washer body, consequently resulting in any internal cavity of the washer body being e.g. pressurized, compacted and/or deformed. Any pressurization, compaction or deformation of any internal cavity will cause an alteration of the acoustic properties of both the cavity and the fluid which it contains. Such acoustic properties may e.g. be the sound velocity in the fluid, the characteristic resonance frequencies of the cavity, etc.

Changes in the acoustic properties of an internal cavity of a washer body, or a fluid contained by an internal cavity of a washer body, may be used in order to estimate the pressurization, compaction or deformation of the internal cavity, and consequently the load on the washer body. The estimation may be performed though e.g. physical simulations of the acoustic behaviour of the internal cavity as a function of pressurization, compaction or deformation, or through utilization of reference measurements. The latter case may e.g. involve measuring the resonance frequency of an internal cavity of a washer body as a function of a known load on the washer body. Reference measurements may alternatively comprise the measurement of sound velocity in a medium contained an internal cavity of a washer body as a function of a known load on the washer body.

The emitted sound signal may according to one embodiment of the invention be a continuous sound signal with a non-zero time duration. The duration may typically be longer than a millisecond. The continuous signal may have a spectral distribution across a frequency range, e.g. in the range between 1 MHz and 10 MHz. It may be spectrally flat in a given frequency range, and may optionally comprise white noise. The corresponding sound echo response comprises in this embodiment of the invention at least an echo response of the sound signal resonating in at least one of the internal cavities of the plate shaped washer body. The calculating of the strain on the plate shaped washer may thus be based a resonance frequency of at least one of the internal cavities in the plate shaped washer body.

The echo response may according to another embodiment of the invention comprise a reference echo response from the internal reference cavity. This reference echo response can be used e.g. for correcting the measured strain for temperature effects, and consequently to obtain a true strain on the plate shaped washer body. Temperature effects may e.g. be pressure or volume changes of any cavity or any fluid filling any cavity of the plate shaped washer body caused by a variation in temperature. According to this embodiment of the invention the washer strain measurement method may further comprise the steps of: calculating a reference strain on the plate shaped washer body at least based on the reference echo response, and estimating a true strain on the on the plate shaped washer at least based on the calculated strain and the calculated reference strain.

Other advantageous features will be apparent from the accompanying claims.

| | |
|---|---|
| 100 | Strain measuring washer assembly |
| 110 | Plate shaped washer body |
| 120 | Washer body central opening |
| 130 | Washer body outer peripheral surface |
| 140 | Closed internal cavity |
| 150 | Sound emitting means |
| 160 | Sound detecting means |
| 170 | Second internal cavity |
| 175 | Internal reference cavity |
| 176 | Spherical internal reference cavity |
| 180 | Base plate body |
| 190 | Lid |
| 200 | Base plate body central opening |
| 210 | Base plate body outer peripheral surface |
| 220 | Closed recess |
| 230 | Base plate body top side |
| 240 | Boundaries of the base plate body |
| 250 | Integral plate shaped washer body |
| 260 | Second recess |
| 270 | Second cavity shaped as a rectangular box |
| 370 | Second cavity shaped as a sphere |
| 290 | Fluid |
| 300 | Fluid filler port |
| 310 | Sealable passage |
| 320 | Combined sound emitting means and sound detecting means |
| 330 | Annular body |
| 340 | Sound pulse |
| 350 | Continuous signal |

The invention claimed is:

1. A strain measuring washer assembly comprising:
   a plate shaped washer body, at least provided with a washer body central opening extending through the plate shaped washer body, a washer body outer peripheral surface, and a closed internal cavity surrounding the washer body central opening;
   sound emitting means, positioned on the washer body outer peripheral surface and configured to emit a sound signal into the plate shaped washer body; and
   sound detecting means positioned on the washer body outer peripheral surface and configured to detect an echo response of the sound signal from the plate shaped washer body.

2. The strain measuring washer assembly according to claim 1, where the plate shaped washer body is further provided with a second internal cavity connected with the closed internal cavity.

3. The strain measuring washer assembly according to claim 2, where any of the cavities in the plate shaped washer body is filled with a fluid.

4. The strain measuring washer assembly according to claim 3, where the plate shaped washer body is provided with a fluid filler port on the washer body outer peripheral surface, comprising a sealable passage through the plate shaped washer body into the closed internal cavity.

5. The strain measuring washer assembly according to claim 1, where the plate shaped washer body is further provided with an internal reference cavity isolated from any other internal cavity of the plate shaped washer body.

6. The strain measuring washer assembly according to claim 1, where the plate shaped washer body comprises a base plate body and lid, where
   the base plate body is at least provided with a base plate body central opening extending through the base plate body, a base plate body outer peripheral surface, and a closed recess on a base plate body top side surrounding the base plate body central opening and extending within boundaries defined by the base plate body central opening and a base plate body outer periphery, and where the lid is configured to be fused to the base plate body top side, forming one integral plate shaped washer body where the recess in the base plate body forms the closed internal cavity in the plate shaped washer body.

7. The strain measuring washer assembly according to claim 6, where the base plate body is further provided with a second recess on the base plate body top side that extends within the boundaries defined by the base plate body central opening and the base plate body outer periphery, and where the second recess forms a second internal cavity in the plate shaped washer body when the lid is fused to the base plate body top side.

8. The strain measuring washer assembly according to claim 7, where the second internal cavity is shaped as a rectangular box or a sphere.

9. The strain measuring washer assembly according to claim 1, where the sound emitting means and the sound detecting means are positioned adjacent to one another.

10. The strain measuring washer assembly according to claim 1, where the sound emitting means and the sound detecting means constitute one unit.

11. The strain measuring washer assembly according to claim 1, where the plate shaped washer body is an annular body extending a length parallel with its central principle axis.

12. A washer strain measurement method comprising the steps of:
providing a plate shaped washer body at least provided with a washer body central opening extending through the plate shaped washer body, a washer body outer peripheral surface and a closed internal cavity surrounding the washer body central opening;
providing sound emitting means on the washer body outer peripheral surface;
providing sound detecting means on the washer body outer peripheral surface;
emitting a sound signal into the plate shaped washer body by the sound emitting means;
detecting a sound echo response of the sound signal, from the plate shaped washer body, by the sound detecting means; and
calculating a strain on the plate shaped washer body at least based on the sound echo response.

13. The washer strain measurement method according to claim 12, where the plate shaped washer body is further provided with a second internal cavity connected with the closed internal cavity.

14. The washer strain measurement method according to claim 12, where the plate shaped washer body is further provided with an internal reference cavity isolated from any other internal cavity of the plate shaped washer body.

15. The washer strain measurement method according to claim 12, where the emitted sound signal is a sound pulse.

16. The washer strain measurement method according to claim 15, where the sound echo response comprises an echo response of the sound pulse reflecting off at least one inner surface of at least one of the internal cavities of the plate shaped washer body, and where the calculating of the strain on the strain measuring washer assembly is based on a time delay between the emitting of the sound pulse and the detecting of the sound echo response.

17. The washer strain measurement method according to claim 16, where the echo response further comprises a reference echo response from the internal reference cavity, and where the washer strain measurement method further comprises the steps of:
calculating a reference strain on the plate shaped washer body at least based on the reference echo response; and
estimating a true strain on the on the plate shaped washer body at least based on the calculated strain and the calculated reference strain.

18. The washer strain measurement method according to claim 12, where the emitted sound signal is a continuous sound signal.

19. The washer strain measurement method according to claim 18, where the continuous sound signal comprises sound frequencies from within the range between 1 MHz and 10 MHz.

20. The washer strain measurement method according to claim 18, where the sound echo response comprises an echo response of the sound signal resonating in at least one of the internal cavities of the plate shaped washer body, and where the calculating of the strain on the strain measuring washer assembly is based a resonance frequency of at least one of the internal cavities in the plate shaped washer body.

* * * * *